United States Patent [19]
Ashizawa et al.

[11] Patent Number: 5,475,070
[45] Date of Patent: Dec. 12, 1995

[54] FLUORINE SYSTEM WATER- AND OIL-REPELLENT AGENT

[75] Inventors: Masahiro Ashizawa; Kengo Imamura; Atsushi Udagawa; Makoto Nagase, all of Sagamihara, Japan

[73] Assignee: Minnesota Mining and Manufacturing Company, St. Paul, Minn.

[21] Appl. No.: 330,356

[22] Filed: Oct. 27, 1994

[30] Foreign Application Priority Data

Nov. 29, 1993 [JP] Japan .................................. 5-297886

[51] Int. Cl.⁶ ............................................. C08F 18/20
[52] U.S. Cl. ........................................................ 526/246
[58] Field of Search ................................................. 526/246

[56] References Cited

U.S. PATENT DOCUMENTS

| | | |
|---|---|---|
| 4,215,205 | 7/1980 | Landucci . |
| 4,426,466 | 1/1984 | Schwartz . |
| 4,468,527 | 8/1984 | Patel . |
| 4,540,457 | 9/1985 | LaValley . |
| 4,566,981 | 1/1986 | Howells . |
| 5,061,184 | 10/1991 | Yawazaki et al. . |
| 5,079,298 | 1/1992 | Kuriyawa et al. . |
| 5,085,975 | 2/1992 | Mueller . |
| 5,132,028 | 7/1992 | Nagase et al. . |
| 5,308,511 | 5/1994 | Coppens et al. . |

FOREIGN PATENT DOCUMENTS

| | | |
|---|---|---|
| 58-1751 | 1/1983 | Japan . |
| 5-222149 | 8/1993 | Japan . |

*Primary Examiner*—Joseph L. Schofer
*Assistant Examiner*—N. Sarofim
*Attorney, Agent, or Firm*—Gary L. Griswold; Walter N. Kirn; Robert H. Brink

[57] ABSTRACT

To provide a water- and oil-repellent agent which, when it is used to treat natural fibers such as cotton and silk, does not damage the feeling of the fibers and does shown an excellent continuation property of water- and oil-repellency effect.

A fluorine system water- and oil-repellent agent comprising, as a main component, units derived from a copolymer comprising polyfluoro-oxyalkyl-containing (meth)acrylate and units derived from a dicarboxylic acid anhydride-containing (meth)acrylate.

7 Claims, No Drawings

FLUORINE SYSTEM WATER- AND OIL-REPELLENT AGENT

This invention relates to a fluorine system water- and oil-repellent agent that can give an excellent water- and oil-repellent property to fibers, especially natural fibers such as cotton or silk etc.

BACKGROUND ART

U.S. Pat. Nos. 4,540,457, 4,566,981, 4,426,466, and 4,468,527 describe fluorine system water- and oil-repellent agents comprising, as a main component, units derived from a perfluoro-oxyalkyl-containing (meth)acrylate. However, these water- and oil-repellent agents gives a poor continuation property of water- and oil-repellency effect, and have a poor water- and oil-repellency-giving effect to a hydrophilic fiber such as cotton or silk.

U.S. Pat. No. 4,215,205 describes fluorine system water- and oil-repellent agents comprising a perfluorooxyalkyl-containing (meth)acrylate added with carbodiimide. However, although this water- and oil-repellent agent has a better water- and oil-repellency-giving effect to hydrophilic fibers, it is not yet sufficient, and this agent gives a poor continuation property of water- and oil-repellency effect.

Japanese Unexamined Patent Publication (Kokai) No. 5-222149 describes a water-repellent composition comprising a copolymer of at least three monomer comprising polyfluoroalkyl-containing (meth)acrylate, urethane bond containing poly(meth)acrylate, and blocked isocyanate containing (meth)acrylate, and blocked polyisocyanate compound. However, since this composition uses a blocked isocyanate, and this has a decomposition temperature of not less than 120° C., so that this composition must be treated at a high temperature, which often injures fibers, this composition can substantially not be used. Further, since this composition also has a high possibility of damaging feeling of fibers, it cannot be used as a fiber treating agent.

Japanese Examined Patent Publication No. 58-1751 discloses that a copolymer of methyl methacrylate and 4-methacryloxy ethyl trimellitic acid can be an excellent adhesive for teeth. This document, however, does not describe to use 4-methacryloxy ethyl trimellitic acid for water- and oil-repellent agents, or to copolymerize it with polyfluoroalkyl-containing (meth)acrylate.

DISCLOSURE OF INVENTION

An object of this invention is to provide a water- and oil-repellent agent which, when it is used to treat fibers, especially natural fibers such as cotton and silk, does not damage the feeling of the fibers and does show an excellent continuation property of water- and oil-repellency effect.

This invention is a fluorine system water- and oil-repellent agent comprising, as a main component, a copolymer (hereinafter referred to as "the copolymer in this invention") comprising units derived from polyfluoro-oxyalkyl-containing (meth)acrylate (in this specification and claims "(meth)acrylate" means "acrylate or methacrylate") and units derived from a dicarboxylic acid anhydride-containing (meth)acrylate.

DETAILED DESCRIPTION

Said polyfluoro-oxyalkyl-containing (meth)acrylate contains, as concrete examples, ones represented by the following formulae. In these formulae, $R^4$ is hydrogen atom or methyl group, and Rf is a polyfluoroalkyl group having 1 to 20 carbon atoms, especially, perfluoroalkyl group.

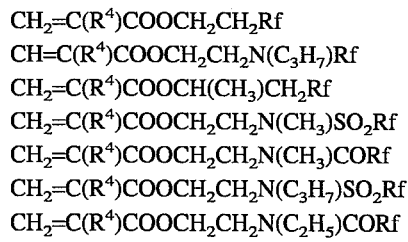

$CH_2=C(R^4)COOCH_2CH_2Rf$ $CH=C(R^4)COOCH_2CH_2N(C_3H_7)Rf$ $CH_2=C(R^4)COOCH(CH_3)CH_2Rf$ $CH_2=C(R^4)COOCH_2CH_2N(CH_3)SO_2Rf$ $CH_2=C(R^4)COOCH_2CH_2N(CH_3)CORf$ $CH_2=C(R^4)COOCH_2CH_2N(C_3H_7)SO_2Rf$ $CH_2=C(R^4)COOCH_2CH_2N(C_2H_5)CORf$ $CH_2=C(R^4)COOCH(CH_2Cl)CH_2OCH_2CH_2N(CH_3)SO_2Rf$

The above dicarboxylic acid anhydride-containing (meth)acrylate is preferably a compound represented by the following formula (1).

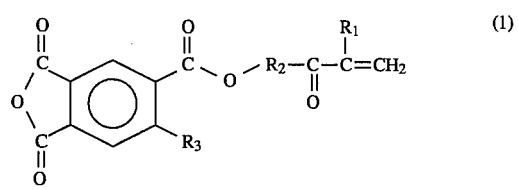

wherein $R^1$ is hydrogen atom or methyl radical, $R_2$ is $-[(CH_2)_nO]_m-$, wherein n is 1 to 18, m is 1 to 20, and $R^3$ is hydrogen atom or COOH. This compound can be synthesized by the dehydrochloric acid reaction of a compound represented by the formula $CH_2=C(R^1)-CO-R^2-OH$ (wherein $R^1$ and $R^2$ are the same meaning as above. As is the same hereinafter.) with a trimellitic acid chloride anhydride, or by the de water reaction of the compound represented by the formula $CH_2=C(R^1)-CO-R^2-OH$ with a trimellitic acid.

The amount of the above units derived from dicarboxylic acid anhydride-containing (meth)acrylate present in the copolymer in this invention is preferably not less than 1 part by weight based on 100 parts by weight of the units derived from polyfluoro-oxyalkyl-containing (meth)acrylate. This is because if less than this amount, the water- and oil-repellency effect of the copolymer is insufficient. The amount is more preferably not less than 2 parts by weight. This is because the water- and oil-repellency effect itself and the continuation property thereof of the copolymer are improved. The amount is most preferably not less than 5 parts by weight. This is because the water- and oil-repellency effect itself and the continuation property of the effect of the copolymer are furthermore improved. On the other hand, the amount is preferably not more than 200 parts by weight based on 100 parts by weight of the units derived from polyfluoro-oxyalkyl-containing (meth)acrylate. This is because if more than this amount, the solubility of the copolymer in organic solvents is poor, and provide a problem of precipitation. The amount is more preferably not more than 50 parts by weight. This is because the solubility of the copolymer to petroleum hydrocarbon is good. The amount is more preferably not more than 30 parts by weight. This is because there is no fear that the feeling of the fiber of the copolymer of this invention is not damaged.

The component in the copolymer in this invention reacts with hydroxy groups and amino groups in hydrophilic fiber, which is confirmed by the inventors with an infrared spectrophotometer, and it remarkably improves the continuation property of water- and oil-repellency effect of the water- and oil-repellent agent with a small amount. Further, since it exhibits the water- and oil-repellency effect and continuation property of this effect with a small amount, it does not substantially damage the feeling of fibers.

The copolymer in this invention preferably contains units derived from a long chain alkyl-containing (meth)acrylate, other than the above two components. By dint of the presence of this component, the copolymer of this invention becomes easily soluble in petroleum hydrocarbons, and it makes possible to use petroleum hydrocarbons which has a relatively low volatility and thus high safety. The long chain alkyl-containing (meth)acrylate preferably has 8 to 18 carbon atoms. Less than 8 carbon atoms may make the copolymer in this invention poorly soluble in the petroleum hydrocarbons. On the other hand, more than 18 carbon atoms may make the component difficult to copolymerize into the copolymer in this invention. Preferable examples of this long chain alkyl-containing (meth)acrylate are octadecyl (meth)acrylate and 2-ethylhexyl (meth)acrylate.

The amount of the units derived from long chain alkyl-containing (meth)acrylate in the copolymer in this invention is preferably not less than 1 part by weight based on 100 parts by weight of the units derived from polyfluoro-oxyalkyl-containing (meth)acrylate. Less than this amount does not bring a sufficient improvement in solubility in solvents of the copolymer in this invention. The amount is more preferably not less than 10 parts by weight. This is because solubility in solvents of the copolymer in this invention is improved. The amount is most preferably not less than 20 parts by weight. This is because solubility in petroleum solvents of the copolymer in this invention is good. On the other hand, the amount is preferably not more than 200 parts by weight based on 100 parts by weight of the units derived from polyfluoro-oxyalkyl-containing (meth)acrylate. This is because when the amount is more than this amount, there is a possibility that the oil-repellency of the treated material may be poor and feeling of the treated fiber may be damaged. The amount is more preferably not more than 100 parts by weight. This is because, in this case, there is less possibility that the oil-repellency of the treated material may be poor and feeling of the treated fiber may be damaged. The amount is most preferably not more than 50 parts by weight. This is because, in this case, there is by far less possibility that the oil-repellency of the treated material may be poor and feeling of the reated fiber may be damaged.

The fluorine system water- and oil-repellent agent according to this invention may contain an organic solvent other than the above copolymer. The solvent dissolves the above copolymer and allow it to penetrate into fibers and leathers etc., so that it can give the fibers etc. the water and oil-repellency effect. As the organic solvent, there may be mentioned, such as petroleum hydrocarbons and polar organic solvent.

Advantages of the petroleum hydrocarbons are firstly that they exert little bad influences on fibers. For example, the polar solvents such as ethyl acetate may shrink fibers and elute dye. However, the petroleum hydrocarbons do not exert such bad influences. Secondly, the petroleum hydrocarbons have an advantage that it has relatively low volatility, and has a high safety. The petroleum hydrocarbons preferably have an aniline point in the range of 50° to 100° C. If the aniline point is lower than 50° C., its flash point is low, which brings a problem of safety. If the aniline point is higher than 100° C., the copolymer, the main component of the fluorine water- and oil-repellent agent is poorly dissolved. Among the petroleum hydrocarbons, paraffinic and naphthenic hydrocarbons are especially preferable. The reason is that aromatic hydrocarbon has relatively large amount of impurities, and tends to leave residual smell of processing. Preferable petroleum hydrocarbons are Aisotol Soft (Trade mark, manufactured by Idemitsu Kosan Inc.), Nikkol L Ace (Trade mark, manufactured by Nihon Kogyo K.K.), Nikko White N-10 (Trade mark, manufactured by Nihon Kogyo K.K.), Newsol DX High Soft (Trade mark, manufactured by Nihon Sekiyu K.K.), Bright Sol (Trade mark, manufactured by Shell Kagaku K.K.), Exxol (Trade mark, manufactured by Exxon Kagaku K.K.).

The advantages of the polar solvent are that it is easy to dry fibers due to their high volatility, that the solvent used in polymerization of the copolymer in this invention can be used as it is, and that they can easily dissolve a wide variety of the copolymer in this invention. Examples of such solvent are ethyl acetate, MIBK (methyl isobutyl ketone), MEK (methyl ethyl ketone), acetone, etc. However, these solvents often exert bad influences such as shrinking fibers etc. Accordingly, it is beneficial to carry out the polymerization of the copolymer in this invention in these solvents, and thereafter add a petroleum solvent to the obtained polymer solution.

The amount of the organic solvent is preferably such that the concentration of the copolymer in this invention in the fluorine system water- and oil-repellent agent solution is 0.1 to 5% by weight. Less than 0.1% by weight makes certain coating and bonding of the copolymer to fibers difficult. More than 5% by weight often makes the feeling of fibers bad. From the same reason, the concentration of the copolymer is more preferably 0.3 to 2.0% by weight.

So long as the property of the copolymer in this invention is not suffer from bad influences, the copolymer in this invention can contain, other than the above three polymer component, units derived from ethylene, propylene, butylene, butadiene, chloroprene, vinyl chloride, vinylidene chloride, styrene, an ester of (meth)acrylic acid and alcohol having not more than 20 carbon atoms, acrylonitrile, vinyl acetate, etc.

EXAMPLES

Hereinafter, this invention will be explained by the following examples. However, this invention should not be construed by those examples.

Examples 1 to 10, Comparative Example 1

Total amount of 12.5 g of 2 or 3 kind of monomers shown in Table 1 was discharged into a 100 ml brown bottle, and further 37.5 g of ethyl acetate and 0.1 g of polymerization initiator (2,2'-azoisobutylonitrile), and then copolymerization was carried out under the nitrogen atmosphere at 65° C. for 20 hours. The resulting polymer solution was placed in a vacuum oven at room temperature for 2 days, to remove ethyl acetate, and a copolymer was obtained. The resulting copolymer was dissolved in the solvents shown in Table 1, to make a processing bath wherein the concentration of the copolymer was 2% by weight. The result of solubility of the copolymer is shown in Table 1. Using this bath, the following tests were carried out.

(a) Processing conditions:
  Cloth used:
    Cloth (1): cotton 100% (JIS Dye fastness test cloth, Shirting No. 3.
    Cloth (2): silk 100% (JIS Dye fastness test cloth).
  Processing way: Padding.
  Drying condition: dry in an oven at 80° C.

(b) Water-repellency test: determined by the way according to spray method of JIS L-1092 (AATCC Test Method 22-1985), and evaluated by ranks of 0 to 100. 100 represents no sticking or wetting of upper surface of a cloth. The criteria of respective ranks are shown in Table 2.

(c) Oil-repellency test: determined by the way according to AATCC Test Method 118-1981. To a treated cloth which is not penetrated only by nujol having the lowest penetration force among the test oils, evaluation No. 1 is given. And to a treated cloth which is not penetrated by n-heptane having the highest penetration force among the test oils, evaluation No. 8 is given. The criteria of the respective ranks are shown in Table 3.

(d) Continuation property of water- and oil-repellency effect: evaluated by dry-cleaning resistance. For this test, a dry-cleaning machine, and perchloroethylene as a solvent were used. In addition, as a dilution solvent at the time of the processing, Exxol D 40 (Trade mark of Exxon Kagaku K.K.) was used.

TABLE 1

|  | Copolymer Composition | Weight Ratio | Solubility | |
|---|---|---|---|---|
|  |  |  | Ethyl Acetate | Exxol D 40 |
| Comparative Example 1 | MeFOSEMA/ ODMA | 65/35 | soluble | soluble |
| Example 1 | MeFOSEMA/ ODMA/4-META | 65/33/2 | soluble | soluble |
| Example 2 | MeFOSEMA/ ODMA/4-META | 65/31/4 | soluble | soluble |
| Example 3 | MeFOSEMA/ ODMA/4-META | 65/30/5 | soluble | soluble |
| Example 4 | MeFOSEMA/ ODMA/4-META | 65/29/6 | soluble | soluble |
| Example 5 | MeFOSEMA/ ODMA/4-META | 65/27/8 | soluble | soluble |
| Example 6 | MeFOSEMA/ ODMA/4-META | 65/25/10 | soluble | soluble |
| Example 7 | MeFOSEMA/ ODMA/4-META | 65/23/12 | soluble | soluble |
| Example 8 | MeFOSEMA/ ODMA/4-META | 65/22/13 | soluble | soluble |
| Example 9 | MeFOSEMA/ ODMA/4-META | 65/21/14 | soluble | a little muddy |
| Example 10 | MeFOSEMA/ 4-META | 65/21/14 | soluble | insoluble |

?MeFOSEMA:

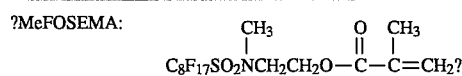

?ODMA:

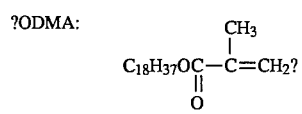

TABLE 1-continued

|  | Copolymer Composition | Weight Ratio | Solubility | |
|---|---|---|---|---|
|  |  |  | Ethyl Acetate | Exxol D 40 |

?4-META:

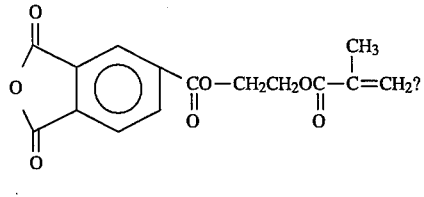

TABLE 2

| Water-repellency No. | State |
|---|---|
| 100 | No sticking or wetting of upper surface. |
| 90 | Slight random sticking or wetting of upper surface. |
| 80 | Wetting of upper surface at spray point. |
| 70 | Partial wetting of whole of upper surface. |
| 50 | Complete wetting of whole of upper surface. |
| 0 | Complete wetting of whole of upper and lower surface. |

TABLE 3

| Oil-repellency No. | Surface Tension (dyne/cm) | Standard Test |
|---|---|---|
| 0 | — | Do not reach 1 |
| 1 | 31.45 | Nujol |
| 2 | 29.6 | Nujol/n-hexadecane = 65/35(wt %) |
| 3 | 27.3 | n-hexadecane |
| 4 | 26.35 | n-tetradecane |
| 5 | 24.7 | n-dodecane |
| 6 | 23.5 | n-decane |
| 7 | 21.4 | n-octane |
| 8 | 19.75 | n-heptane |

TABLE 4

| | Processing Bath Solvent | | | | | | | |
|---|---|---|---|---|---|---|---|---|
| | Ethyl Acetate | | | | Exxol D 40 | | | |
| | Cloth (1) | | Cloth (2) | | Cloth (1) | | Cloth (2) | |
| Example | Water-Repel. | Oil-Repel. | Water-Repel. | Oil-Repel. | Water-Repel. | Oil-Repel. | Water-Repel. | Oil-Repel. |
| Comp. 1 | 80 | 3 | 100 | 5 | 70− | 2 | 70 | 2 |
| 1 | 100 | 4 | 100 | 6 | 80 | 2 | 80 | 3 |
| 2 | 100 | 4 | 100 | 5 | 80+ | 2 | 80+ | 3 |
| 3 | 100 | 4 | 100 | 5 | 80+ | 3 | 90− | 3− |
| 4 | 100 | 4 | 100 | 5 | 80+ | 2 | 80+ | 3 |
| 5 | 100 | 4 | 100 | 5 | 90− | 3 | 90− | 3 |
| 6 | 100 | 4 | 100 | 5 | 90− | 3 | 90+ | 3 |

TABLE 4-continued

| | Processing Bath Solvent | | | | | | | |
|---|---|---|---|---|---|---|---|---|
| | Ethyl Acetate | | | | Exxol D 40 | | | |
| | Cloth (1) | | Cloth (2) | | Cloth (1) | | Cloth (2) | |
| Example | Water-Repel. | Oil-Repel. | Water-Repel. | Oil-Repel. | Water-Repel. | Oil-Repel. | Water-Repel. | Oil-Repel. |
| 7 | 100 | 4 | 100 | 5 | 90+ | 3 | 100– | 3 |
| 8 | 100 | 3– | 100– | 3 | 90 | 2 | 100 | 2 |
| 9 | 100 | 3 | 100– | 3 | 90– | 2 | 80+ | 2– |
| 10 | 100 | 4 | 100 | 4 | — | — | — | — |

TABLE 5

| | | Comp. Example 1 | | Example 6 | |
|---|---|---|---|---|---|
| Cloth | Performance | Initial | After Dry Cleaning | Initial | After Dry Cleaning |
| (1) | Water-Repel. | 70– | 50+ | 90– | 80– |
| | Oil-Repel. | 2 | 0 | 3 | 0 |
| (2) | Water-Repel. | 70 | 50 | 90+ | 80– |
| | Oil-Repel. | 2 | 0 | 3 | 0 |

Effect of the Invention

According to this invention, a water- and oil-repellent agent which, when it is used to treat fibers, especially natural fibers such as cotton and silk, does not damage the feeling of the fibers and does show an excellent continuation property of water- and oil-repellency effect is provided. The water- and oil-repellent agent according to this invention can be used to processing of fibers, processing of leathers, processing of papers, metals, and glasses, and surface treatment of optical fibers.

We claim:

1. A water- and oil-repellent treating agent comprising, as a main component, a copolymer comprising units derived from polyfluoro-oxyalkyl-containing (meth)acrylate and units derived from a dicarboxylic acid anhydride-containing (meth)acrylate.

2. A water- and oil-repellent treating agent according to claim 1, wherein said dicarboxylic acid anhydride-containing (meth)acrylate is represented by the following formula (1):

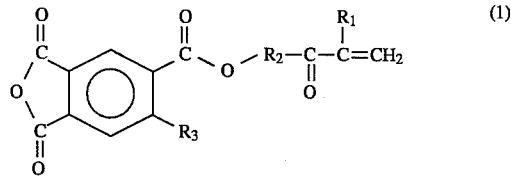

wherein $R^1$ is hydrogen atom or methyl radical, $R^2$ is $-[(CH_2)_nO]m-$, wherein n is 1 to 18, m is 1 to 20, and R3 is a hydrogen atom or COOH.

3. A water- and oil-repellent treating agent according to claim 1 or 2, wherein said copolymer comprises 1 to 200 parts by weight of said units derived from dicarboxylic acid anhydride-containing (meth)acrylate based on 100 parts by weight of said units derived from polyfluoro-oxyalkyl-containing (meth)acrylate.

4. A water- and oil-repellent treating agent according to claim 1, 2 or 3, wherein said copolymer further comprises 1 to 200 parts by weight of units derived from a long chain alkyl-containing (meth)acrylate based on 100 parts by weight of said units derived from polyfluorooxyalkyl-containing (meth)acrylate.

5. A water- and oil-repellent treating agent according to claim 4 wherein said long chain alkyl containing (meth)acrylate is octadecyl (meth)acrylate or 2-ethylhexyl (meth)acrylate.

6. A water- and oil-repellent treating agent according to any of claims 1 to 5 wherein said water and oil-repellent agent further comprises organic solvent.

7. A water- and oil-repellent treating agent according to claim 6 wherein said organic solvent is a petroleum hydrocarbon.

* * * * *